(No Model.)
B. F. GRAM & W. BARD.
NUT LOCK.
No. 447,311.  Patented Mar. 3, 1891.
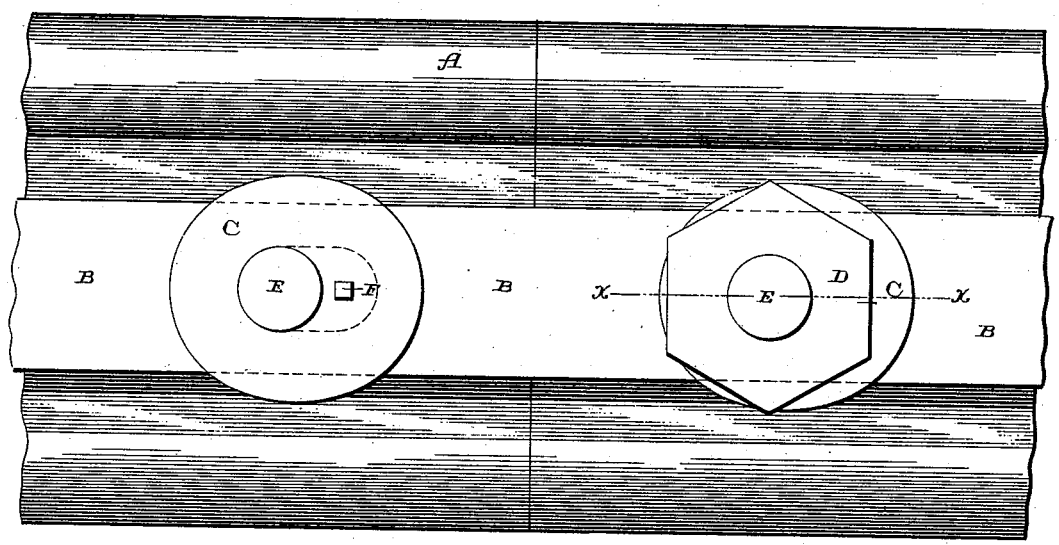
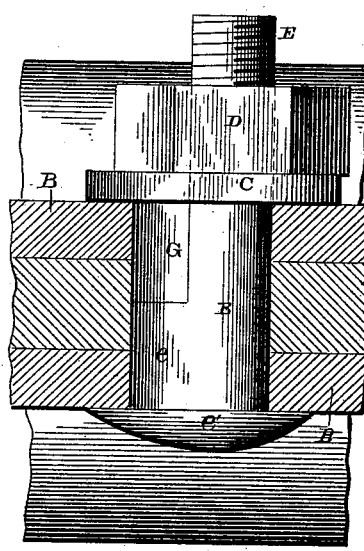
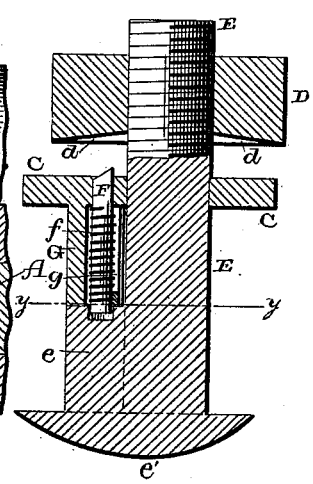
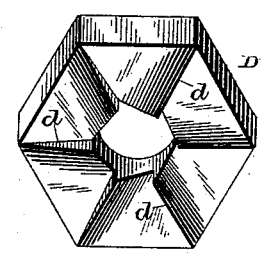
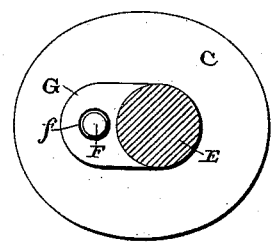
Witnesses:
Geo. A. Lane
Ella L. Gerhart
Inventor:
B. F. Gram
Wm. Bard
By Wm. R. Gerhart
Atty

UNITED STATES PATENT OFFICE.

BENJAMIN F. GRAM, OF CORDELIA, AND WILLIAM BARD, OF COLUMBIA, PENNSYLVANIA.

NUT-LOCK.

SPECIFICATION forming part of Letters Patent No. 447,311, dated March 3, 1891.

Application filed December 10, 1890. Serial No. 374,160. (No model.)

*To all whom it may concern:*

Be it known that we, BENJAMIN F. GRAM and WILLIAM BARD, citizens of the United States, residing in Cordelia and Columbia, respectively, in the county of Lancaster and State of Pennsylvania, have invented certain Improvements in Nut-Locks, of which the following is a specification.

Our invention relates to washer nut-locks; and it consists in the construction and combination of parts, as will be hereinafter described, and specifically pointed out in the claims.

In the accompanying drawings, which form a part of this specification, Figure 1 is a side elevation of two rails in the connection between the ends of which our nut-lock is used. Fig. 2 is a horizontal section of the rail and fish-plates on the line $x\,x$, Fig. 1, showing a top plan view of the bolt and washer when the nut is locked on the bolt. Fig. 3 is a longitudinal section of the bolt, washer, and nut, the latter being in position to be screwed up against the washer. Fig. 4 is a perspective view of the inner face of the washer, showing the ratchet formed thereon. Fig. 5 is a vertical section of the entire bolt on the line $y\,y$, Fig. 3.

Similar letters indicate like parts throughout the several views.

Referring to the details of the drawings, A represents the ends of adjoining rails, and B the fish-plates.

E indicates a bolt having an enlargement or lateral extension $e$ on one side, extending from the head $e'$ of the bolt toward the other end thereof, so as to project about half-way through the web of the rail when the bolt is in place, as shown in Fig. 2. In cross-section this enlarged part of the bolt is oval or other elongated shape adapted to prevent the bolt from turning in the hole.

C is a washer having the usual bolt-hole through which the bolt passes. Upon the inner face of the washer and on one side of the bolt-hole there is formed a lug G, similar in shape to the enlargement $e$ of the bolt, the side adjoining the bolt being shaped to fit closely against the same, as shown in Fig. 5. In the lug G there is a longitudinal recess $g$, and in this recess is placed a longitudinal pawl F, one end of which works through a suitable opening in the washer C. A spring $f$ is coiled about the pawl, one end bearing against the end of the recess and the other being fastened to the pawl, acting to project the end of the pawl through the opening in the washer C.

D represents a nut having radial ratchet-teeth formed on its inner face, as shown in Figs. 3 and 4. In the drawings the ratchet is shown as having six teeth; but this number may be varied to suit the requirements of the work for which the nut-lock is to be used.

In operating, the bolt is inserted, as usual. The washer is then pushed over it, the lug G being opposite the enlargement $e$ of the bolt. After the bolt and washer are placed in their proper positions the nut is screwed on the bolt with the ratchet-face toward the washer. As the nut closes on the washer, the end of the pawl F engages the teeth of the ratchet and, as it is beveled for that purpose, slips over them as the nut is screwed home, the inner end of the pawl being pushed back through an opening in the rear wall of the recess $g$ and into a socket in the enlargement $e$, as shown in Fig. 3. After the nut is screwed up it is prevented from turning back by the engagement of the pawl with the ratchet, the pawl being held in such engagement by the spring $f$.

Having thus described our invention, what we claim as new, and desire to secure by Letters Patent, is—

1. In a nut-lock, the combination, with a bolt having a shoulder formed thereon, of a washer having a recessed lug, a spring-actuated pawl located in said recess, and a ratchet-faced nut adapted to be engaged by the pawl, substantially as and for the purpose specified.

2. In a nut-lock, the combination, with a bolt having a shoulder formed thereon, of a washer, a recessed lug formed on the inner face of the washer and having an opening in its rear wall, a pawl located in the recess and having its rear end registering with the opening in the rear wall thereof, a ratchet-faced nut constructed to be engaged by the pawl, and a spring adapted to keep the pawl in engagement with the ratchet, substantially as specified.

3. In a nut-lock, the combination, with a bolt enlarged on one side, said enlargement extending from the head of the bolt a portion of the distance between the head and the screw and having a socket in the inner end thereof, of a washer having a recessed lug adapted to bear against the inner end of the enlargement of the bolt and having an opening in its rear wall registering with the socket in said enlargement, a pawl located in said recess and extending through the washer and adapted to pass through the opening in the rear wall of said recess, a ratchet-faced nut constructed to be engaged by the pawl, and a spring coiled about the pawl and adapted to hold the same in engagement with the ratchet, all constructed and operating substantially as and for the purpose specified.

B. F. GRAM.
WM. BARD.

Witnesses:
F. P. D. MILLER,
GEO. D. MILLER.